J. O. HEINZE.
WATER COOLING SYSTEM.
APPLICATION FILED FEB. 14, 1918.
1,356,066.  Patented Oct. 19, 1920.
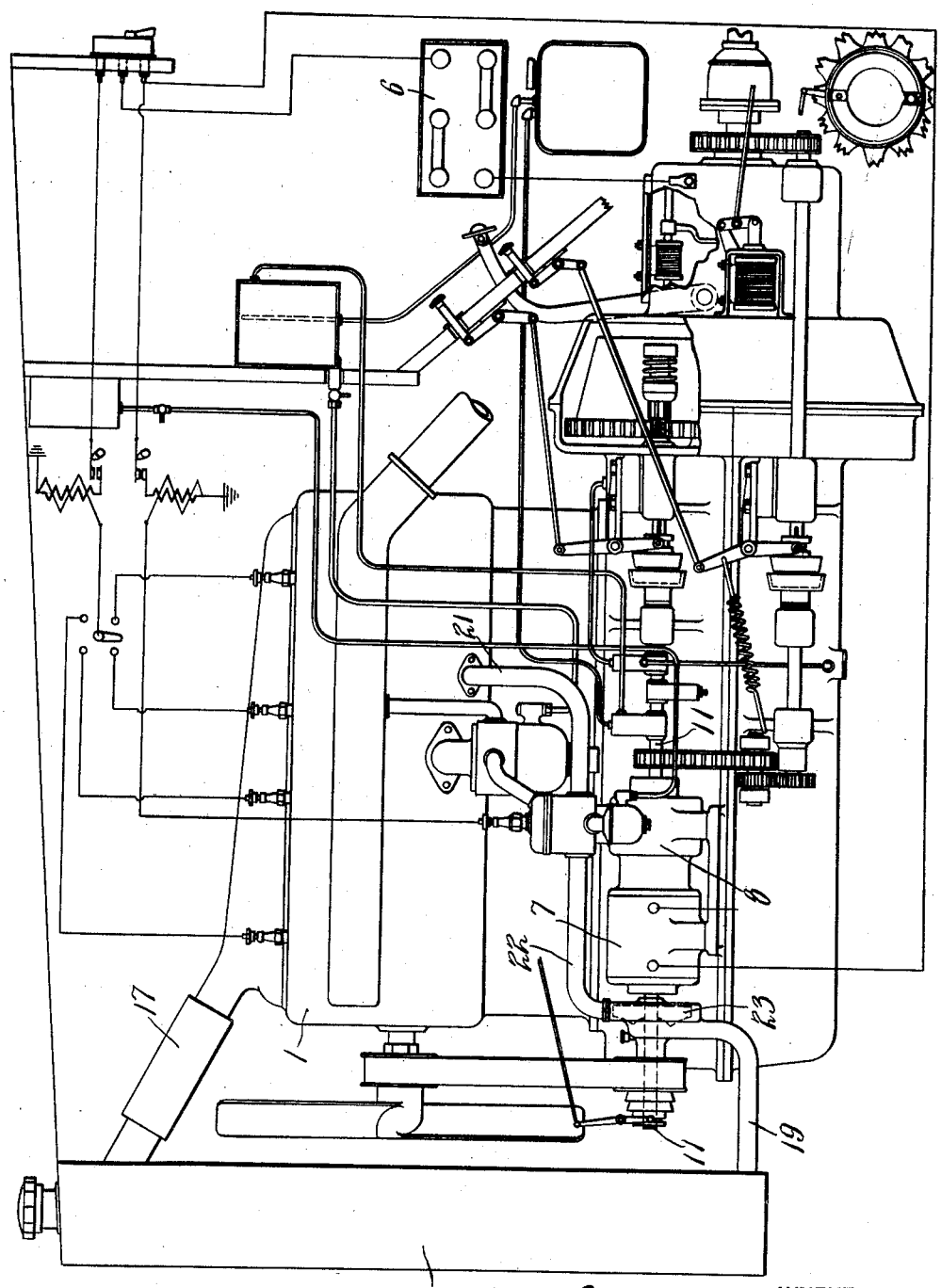
INVENTOR.
John O. Heinze
BY
Bedford & Doolittle,
ATTORNEYS.

UNITED STATES PATENT OFFICE.

JOHN O. HEINZE, OF LOWELL, MASSACHUSETTS, ASSIGNOR OF ONE-HALF TO ALVIN F. KNOBLOCH, OF INDIANAPOLIS, INDIANA.

WATER-COOLING SYSTEM.

1,356,066.     Specification of Letters Patent.     Patented Oct. 19, 1920.

Original application filed November 4, 1916, Serial No. 129,540. Divided and this application filed February 14, 1918. Serial No. 217,286.

*To all whom it may concern:*

Be it known that I, JOHN O. HEINZE, a citizen of the United States, residing at Lowell, Middlesex county, and State of Massachusetts, have invented and discovered certain new and useful Improvements in Water-Cooling Systems, of which the following is a specification.

My invention relates to a water cooling system for internal combustion engines and consists in the combinations and arrangements of elements hereinafter described and particularly set forth in the accompanying claims.

The invention has for its purpose to provide a water cooling system for a power plant or unit embodying a main engine and an auxiliary engine which are operable simultaneously or independently, and in which the auxiliary unit serves as a starting medium for the main engine, and wherein the operation of the auxiliary engine alone serves to circulate the water of the cooling system through the water jacket of the main engine and thereby enables said engine to be readily started, or maintained at the proper temperature when not running.

The invention forms a division of the subject matter disclosed in my co-pending application for U. S. patent entitled Auxiliary power systems for internal combustion engines, Serial No. 129,540, and dated November 4, 1916.

The invention is disclosed by way of illustration in the accompanying drawing which shows a side elevational view of the main and auxiliary power units with the invention applied thereto.

Referring to the drawing, 1 is an internal combustion engine constituting the main motor, and 6 is an electric storage battery constituting one of the primary sources of energy of the generating set, and across the line of the battery is an electro-magnetic machine 7 which is adapted to serve either as a motor or as a generator, the change from the one to the other function being automatically effected by the overbalancing of counter electro-motive forces.

On the shaft of the motor generator 7 is an internal combustion engine 8 of less capacity than the main engine but of sufficient power to drive the generator, to start the main engine and to drive the vehicle or other object at moderate speed independently of the main engine. The electro-magnetic machine and the battery are of such capacity that when said machine is acting as a motor its capacity is not only sufficient to start the auxiliary engine but also to add its power to that of the auxiliary engine either when the latter is running at low speeds or at its maximum so as to aid in rotating the auxiliary engine shaft and thus assist in starting the main motor, or driving the driven element ordinarily driven by said main motor.

The auxiliary engine is preferably adapted to operate continuously and when so operating it has a fixed speed, and consequently drives the motor generator and the other parts to which it is connected at a uniform speed which is an important factor in delivering current of constant amperage to the battery for recharging purposes and also of advantage in connection with the utilization of the engine for driving other mechanisms, as compared to the usual system in which the main engine is employed to recharge the battery and perform said other functions and in which arrangement the power delivered from said main engine varies, of course, with the variation of the speed thereof.

The elements described in the foregoing operate after the manner stated, and for a further description of said elements, their associate parts, and manner of operation reference may be had to my co-pending application herein identified.

The auxiliary engine is provided with a water circulation system which is interconnected by pipes 21 and 22 with the circulation of the main engine radiator 20 whereby the heat generated in the auxiliary engine water system may be utilized to heat the main engine through the water jacket of the latter for the purpose of facilitating the starting of the motor or to keep the same at the proper temperature when it is not running and which heating is of particular advantage in cold weather. Coöperating with the water pipes 19 and 22, and with the line shaft 11 of the auxiliary engine is a water pump 23 which is of the centrifugal type and which is mounted directly on said shaft. Said pump, owing to the centrifugal type and to the fact that the small engine has a fixed speed, may be exactly proportioned to the capacity of said engine and thus the entire power delivered to the pump utilized, thereby obtaining an increased efficiency in driving the pump as distinguished from those arrangements in which the same is driven by the main engine and owing to the variable speeds will either drive the pump at such excessive speed as to result in a loss of power, or will not drive it sufficiently fast, as when the engine is operating slowly under a heavy load.

The cylinders of the main internal combustion engine 1 are provided with the usual water jacket construction and communicate with the radiator 20 through the pipe 17, and in like manner, the auxiliary internal combustion engine 8 has a water jacket communicating with the pipe 22, and which pipe receives the water from the radiator 20 by way of the pipe 19 that leads directly to the centrifugal pump 23.

It is obvious that those skilled in the art may vary the details of construction and arrangements of parts without departing from the spirit of my invention, and therefore I do not wish to be limited to such features except as may be required by the claims.

Having thus described my said invention what I claim as new and desire to secure by Letters Patent is:

1. A power plant comprising a plurality of heat-generating power units some of which are water-jacketed, a water cooling device and means selectively operated from any one of several of the power units to circulate cooling water through the water jackets of the units.

2. A power plant comprising a plurality of co-acting heat-generating power units some of which are water-jacketed, a water cooling device and means selectively operated from any one of several of the power units to circulate cooling water through the water jackets of the units.

3. A power plant comprising a plurality of co-acting heat-generating power units some of which are water-jacketed, a water cooling device and means selectively operated from any one of several of the power units to circulate cooling water in series through the water jackets of the units.

In witness whereof, I have hereunto set my hand and seal at Lowell, Massachusetts.

JOHN O. HEINZE. [L. S.]